Nov. 18, 1958 E. P. TURNER ET AL 2,860,748

ELECTRICALLY CONTROLLED POWER TRANSMITTERS

Filed Sept. 26, 1955 4 Sheets-Sheet 1

WITNESS

William Martin

INVENTORS
Edgar P. Turner
Lorenz A. Wendel
Vladimir Marchuk

BY J. Stanford

ATTORNEY

Nov. 18, 1958 E. P. TURNER ET AL 2,860,748

ELECTRICALLY CONTROLLED POWER TRANSMITTERS

Filed Sept. 26, 1955 4 Sheets-Sheet 2

WITNESS

William Martin

BY

INVENTORS
Edgar P. Turner
Lorenz A. Wendel
Vladimir Marchuk

J. E. Stanford
ATTORNEY

ELECTRICALLY CONTROLLED POWER TRANSMITTERS

Filed Sept. 26, 1955 4 Sheets-Sheet 3

INVENTORS
Edgar P. Turner
Lorenz A. Wendel
Vladimir Marchuk
BY J. E. Stanford
ATTORNEY INVENTORS
Edgar P. Turner
Lorenz A. Wendel
Vladimir Marchuk
ATTORNEY United States Patent Office 2,860,748

Patented Nov. 18, 1958

2,860,748

ELECTRICALLY CONTROLLED POWER TRANSMITTERS

Edgar P. Turner, Watchung, Lorenz A. Wendel, Somerville, and Vladimir Marchuk, Manville, N. J., assignors to The Singer Manufacturing Company, Elizabeth, N. J., a corporation of New Jersey Application September 26, 1955, Serial No. 536,414

7 Claims. (Cl. 192—18)

This invention relates to electric power transmitters for machine tools which can be remotely controlled by means of an electrically energized solenoid actuating system.

It is an object of the invention to provide an electric power transmitter with solenoid actuated control means.

It is another object of the invention to provide an electric power transmitter with remote control means for actuating the transmitter.

A further object of the invention is to provide automatic control means for energizing the transmitter solenoids in timed relation.

Yet another object is to provide an electric powered, solenoid actuated transmitter with self-adjusting means for the solenoid control.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

In the drawings, Fig. 1 is a side view, partly in section, of an electric power transmitter including a preferred embodiment of the invention.

In the drawings, the transmitter unit is the same in each modification, only the solenoid control means being different. The same numerals are used to identify identical transmitter parts in all figures of the drawings.

Figure 1:
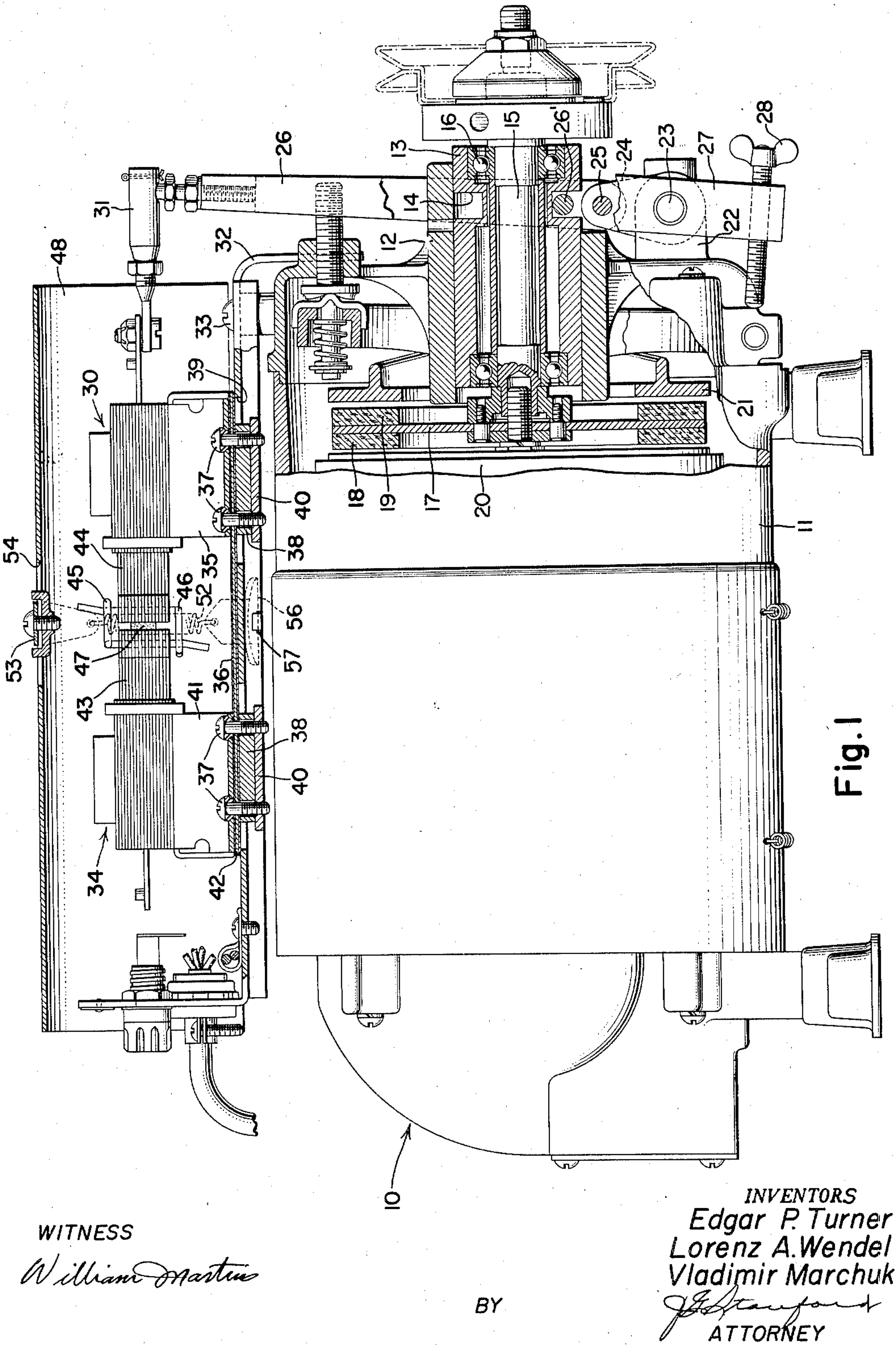

Referring more particularly to the drawings, in Fig. 1 is shown an electric power transmitter 10 provided with a casing 11 having a support hub 12 formed on one end closure. The support hub 12 carries a rotatable and longitudinally movable control sleeve 13 having a groove 14 formed in its outer surface. A driven shaft 15 is rotatably journaled in bearings 16 carried by the sleeve which also fix the sleeve 13 and the shaft 15 against relative axial motion. One end of the driven shaft 15 carries a friction disc 17 provided with a clutch facing 18 on one side and a brake facing 19 on the other side. The clutch facing 18 is engageable with a rotatable member 20 and the brake facing 19 is engageable with a brake ring 21 carried by the casing 11. The structure described is similar to the structure described in more detail in the copending U. S. patent application Serial No. 285,504, filed May 1, 1952, of E. P. Turner, now U. S. Patent No. 2,822,903.

Two bosses 22 are formed on the right end of the transmitter 10 and carry a pivot pin 23. This structure can best be seen in Figs. 4 and 5. A pivot support yoke 24 is fastened securely to the pivot pin 23 and supports a fulcrum pin 25 on which an actuating lever 26 is pivoted. An adjusting lever 27 is fastened securely to the pivot pin 23 and is provided with thumb screws 28 and 29 threaded through the ends of the lever 27 and engageable with the casing 11. The upper end of the actuating lever 26 is connected to one end of the armature of a brake-engaging solenoid 30 through a flexible connection 31. A pin 26' carried by the lever 26 enters the groove 14 for moving the sleeve 13 when the lever 26 is moved. A mounting plate 32 is fastened to the transmitter casing 11 by screws 33 and forms a slideway for a clutch engaging solenoid 34 and the brake solenoid 30. The frame 35 of the brake solenoid 30 is fastened to a plate 36 by screws 37 which pass through stop blocks 38 positioned in slots 39 in the mounting plate 32 and are threaded into retaining plates 40. The retaining plates 40 are larger than the slots 39 to prevent the solenoid 30 and plate 36 from lifting off the plate 32. The frame 41 of the clutch engaging solenoid 34 is fastened to the plate 36 in a similar manner. A thin sheet 42 of friction material is disposed between the plate 32 and the mounting plate 36. It should be noted that the retaining plates 40 permit substantial vertical movement between the plate 36 and the mounting plate 32. The armature 43 of the clutch engaging solenoid 34 is secured to the armature 44 of the brake engaging solenoid 30 by a pair of hairpin springs 45 and 46 which draw the armature heads together against a block of resilient material 47. The solenoids 30 and 34 are connected to a source of electrical power (not shown) through appropriate switches, to be described later. Energization of solenoid 34 draws the armature 43 to the left as viewed in Figs. 1 and 2, while energization of solenoid 30 draws armature 44 to the right. A cover 48, fitted over the solenoids 30 and 34, rests on the plate 36 and is prevented from moving longitudinally with respect to the plate 36 by a finger 49 on the plate 36 which enters a notch 50 in the cover 48. Two coil springs 51 and 52 are fastened at one end to an anchor plate 53 which can be clamped to the cover 48 at a selected position along the length of the longitudinally extending slot 54, normally the center of the slot. Clips 55 and 56 fasten the other ends of the springs 51 and 52 to the stationary mounting plate 32. The clips 55 and 56 enter notches 57 formed in the lower edge of the mounting plate 32.

It is believed that the operation and advantages of this first embodiment of the invention will now be readily understood. When the unit is at rest, the parts are in the position shown in Fig. 1. Upon energization of the clutch engaging solenoid, the armature 43 is forced to the left, as viewed in Fig. 1, acting through the springs 45 and 46 and armature 44 to move the end of the lever 26 to the left, thus moving the sleeve 13 and the disc 17 to the left to engage the clutch. To engage the brake, the solenoid 34 is de-energized and the brake engaging solenoid 30 is energized to move the armature 44 and the upper end of the lever 26 to the right, thus carrying the sleeve 13 and the disc 17 to the right to engage the brake. The position of the lever fulcrum pin 25 can be changed by adjusting the thumb screws 28 and 29. It will be appreciated that this adjustment permits the position of the disc 17 relative to the driving member 20 and brake 21 to be changed without changing the positions of the solenoids 30 and 34 relative to the casing 11.

In order to obtain proper engagement of the clutch and brake without overheating the solenoids 30 and 34, it is essential that the armature 44 bottom in the solenoid frame at substantially the same instant that the brake engages and that the armature 43 bottom in the frame of the solenoid 34 at substantially the same instant that the clutch is engaged. This adjustment is accomplished automatically due to the friction connection between the plates 36 and 32. The springs 51 and 52 exert a force on the cover 48 and the plate 36 to provide sufficient friction force between the plates 36 and 32 to keep the plate 36 from moving relative to the plate 32 under normal operating conditions. However, assuming that the solenoids 30 and 34 are displaced from their correct operating positions by, for example one-quarter inch to the left as viewed in Fig. 1, the end of the lever 26 is displaced also, and places the disc 17 too close to the member 20. When the clutch solenoid 34 is energized, the armature 43 starts to move to the left but the facing 18 on the disc 17 will engage the member 20 before the armature 43 seats in the frame of the solenoid 34. As a result, the solenoid still exerts a force after the clutch elements are firmly engaged. This force tends to move the solenoid bodily to the right by causing the plate 36 to slide relative to the plate over the friction material 42. Of course, since the brake solenoid 30 and the clutch solenoid 34 are both firmly attached to the plate 36, the brake solenoid also tends to move to the right without disturbing the position of the clutch solenoid 34 relative to the brake solenoid 30. However, the friction force between the plates 32 and 36 is greater than the solenoid 34 can overcome so the armature 43 does not seat but the clutch is engaged. If this condition continued, the solenoid 34 might overheat and burn out. However, if the clutch-engaging solenoid 34 is de-energized and the brake-engaging solenoid 30 energized, the armature 44 will move to the right as viewed in Fig. 1. Since the solenoids are displaced to the left, the armature 44 bottoms in the frame of the solenoid 30 with a hammer-blow before the brake facing 19 engages the brake ring 21. The hammer-blow of the armature 44 is great enough to overcome the friction force between the plates 32 and 36 and causes the plate 36 carrying the solenoids 30 and 34 to move to the right. Alternate energizing and de-energizing of the solenoids 30 and 34 a few times causes the plate 36 to move until the armatures 43 and 44 both seat and the clutch engaging force and brake engaging force are equal. It will be understood that each time an armature seats, even after it has reached the correct position, the plate 36 may move slightly in order to absorb some of the shock of the hammer-blow. In any event, if the plate 36 is moved from its correct position the blows of the armatures 43 and 44 soon drive it to its correct position. In this manner, the clutch solenoid 34 pulls itself to its proper operating position and also properly positions the brake solenoid 30 at the same time. If the plate 36 is positioned too far to the right so that the disc 17 is too close to the brake, alternate energization of the solenoids 30 and 34 will automatically correctly position the solenoids in a similar manner. With this arrangement, as the friction surfaces wear it is only necessary to adjust the brake to maintain the distance between the brake 21 and the member 20 substantially constant. It is not necessary to adjust the position of the solenoids 30 and 34.

If a heavier braking force is desired, the anchor plate 53 is moved from the center of the slot 54 to the right, as viewed in Fig. 1. The force of the solenoid 30 for engaging the brake is now supplemented by a component of the force exerted by the springs 51 and 52. The total brake engaging force is now the force of the solenoid plus the horizontal component of the springs which are no longer disposed in a vertical plane. Of course, the clutch-engaging force is diminished by the horizontal component of the spring force resulting in a light clutch engagement. A light brake engagement and heavy clutch engagement can be obtained in a similar manner by moving the anchor plate 53 to the left of the center of the slot 54.

The relatively slidable plates 32 and 36 also provide a brake and clutch engaging overload feature. The force applied to engage either the clutch or the brake cannot be greater than the force required to move the plates 32 and 36 relative to each other multiplied by the mechanical advantage of the lever 26. Peening of the solenoid seats is also reduced since the solenoid can move slightly under the hammer-blow of the armature as it seats. The pad 47 and springs 45 and 46 holding the armatures 43 and 44 together eliminate any peening action between the armatures and permit the armatures 43 and 44 to be self-aligning. If it is necessary to repair the unit, the clutch and brake can be readily disabled by releasing the springs 51 and 52 and removing the cover 48. When the cover 48 is removed, the plates 32 and 36 are free to move relative to each other. Thus, since there is no reaction force for the solenoids 30 and 34, the clutch or brake cannot be engaged even if the solenoids are accidentally energized.

The fulcrum lever 27 can be moved about the axis of the pivot pin 23 in order to move the fulcrum pin 25 with respect to the casing 11. When the pin 25 is moved, the lever 26 pivots about the pin 26' causing the upper end of the lever 26 to move. This adjustment is obtained by turning the thumb-screws 28 and 29 and is used only for positioning the upper end of the lever 26 within the range of movement of the solenoid armatures 43 and 44.

Figures 2, 3:
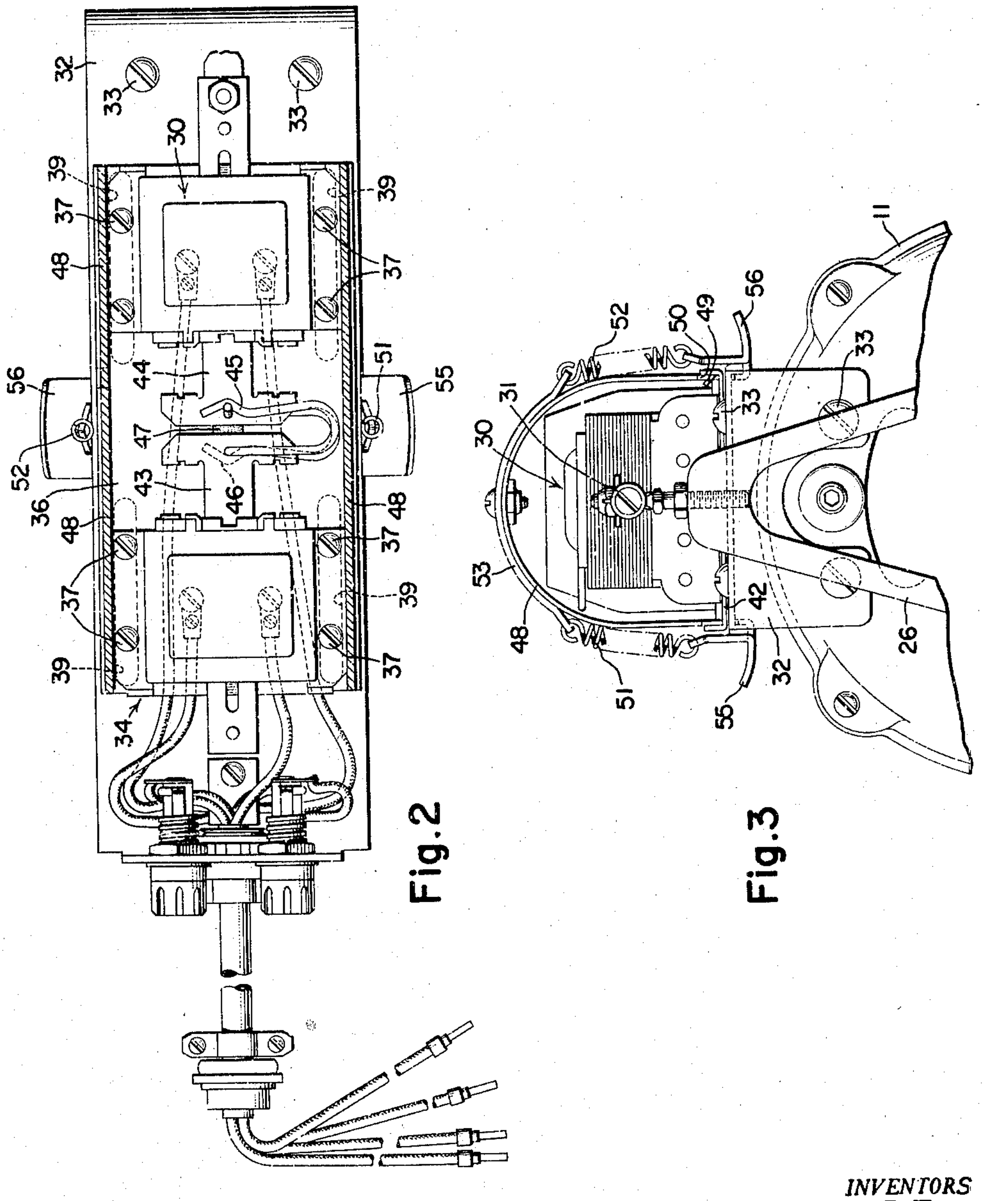
Fig. 2 is a top plan view partly in section of the solenoid control mechanism of Fig. 1.
Fig. 3 is an end view of the solenoid control mechanism of Fig. 2.
Figures 4, 6:
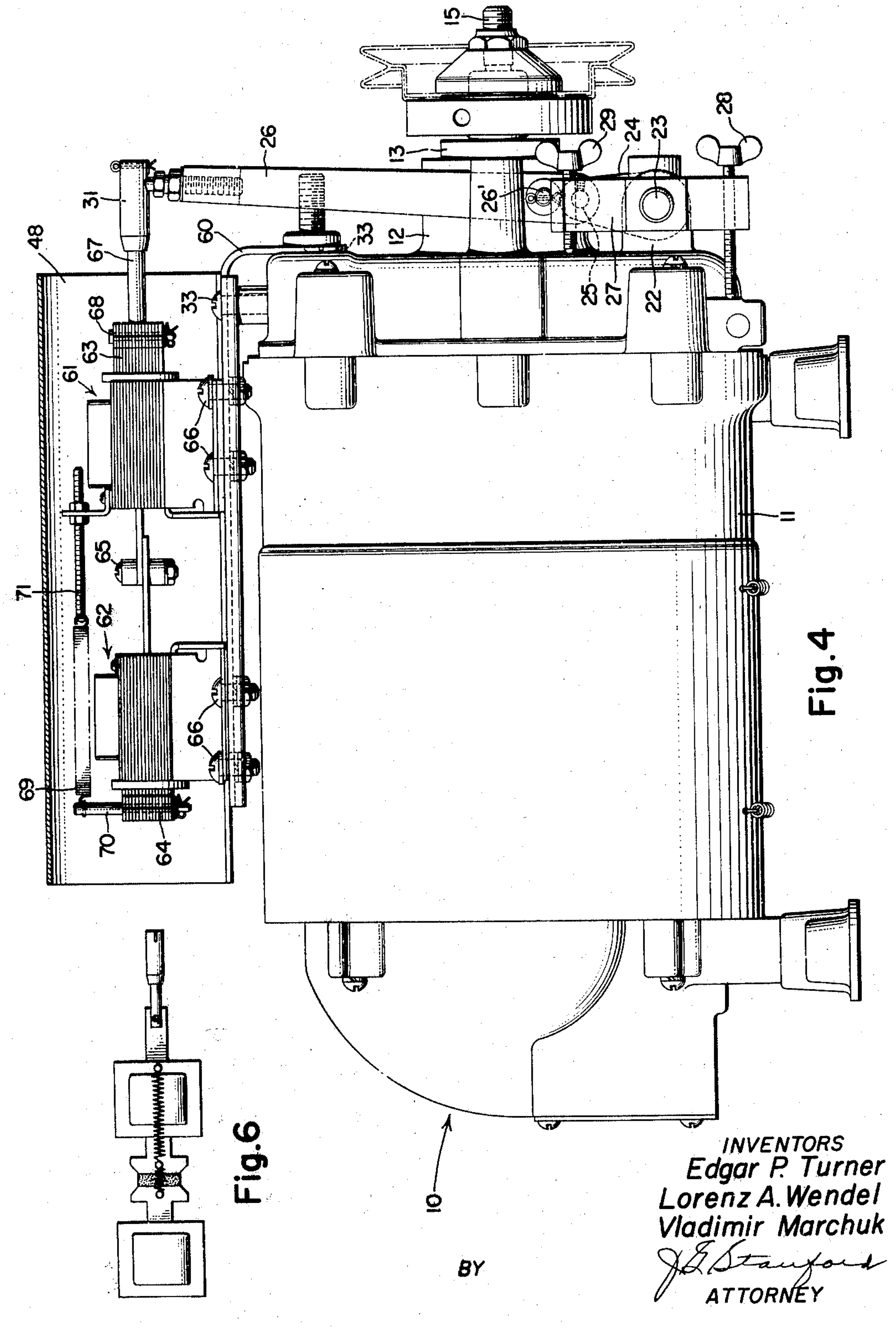
Fig. 4 is a side elevation of the transmitter of Fig. 1 provided with a second embodiment of the solenoid control mechanism.
Fig. 6 is a top plan view of a modified solenoid arrangement.
Figure 5:
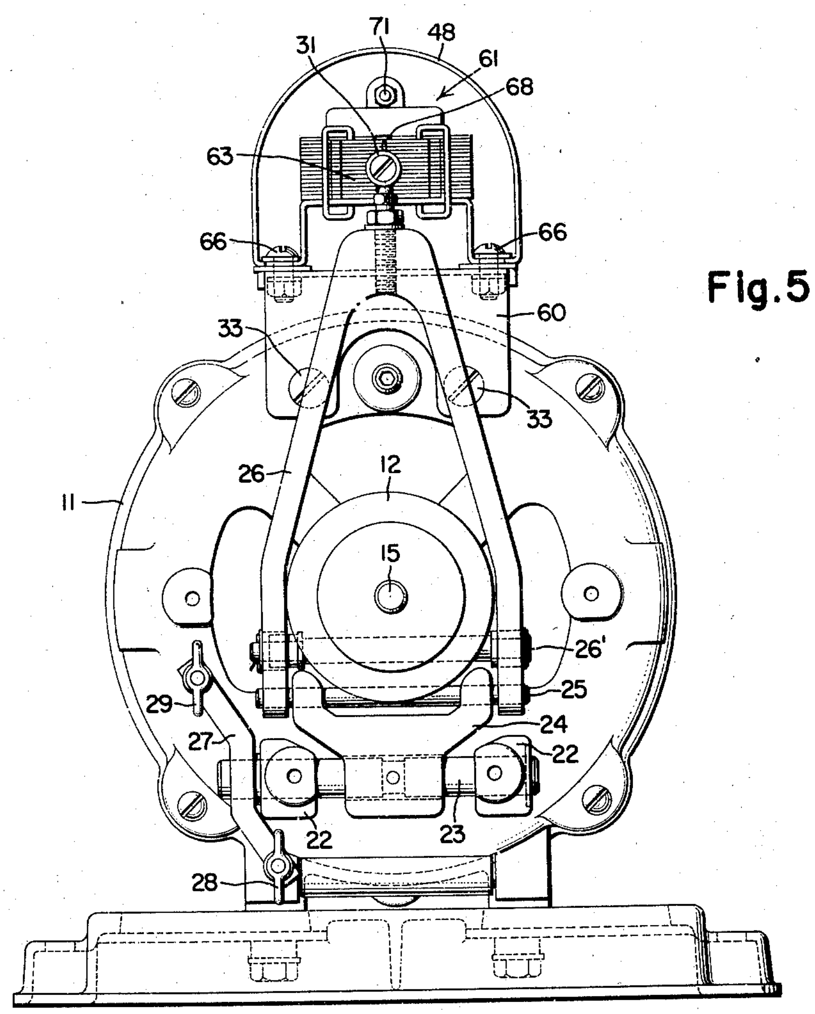
Fig. 5 is a right end view of the transmitter of Figs. 1 and 4 provided with the solenoid control embodiment of Fig. 4.

Referring more particularly to the embodiment shown in Figs. 4 and 5 of the drawings, a transmitter is shown which is identical to the transmitter shown in Figs. 1, 2 and 3. Only the solenoid actuating mechanism is different. The same numerals have been used to identify parts which are identical with those shown in Figs. 1, 2 and 3.

A support plate 60 fastened to the casing 11 by screws 33 carries a clutch-engaging solenoid 61 and a brake engaging solenoid 62. The clutch-engaging solenoid is provided with an armature 63 and the brake-engaging solenoid 62 is provided with an armature 64. The armatures 63 and 64 are rigidly fastened together by a screw 65. Each solenoid is firmly fastened to the plate 60 by screws 66. The armature 63 of the clutch-engaging solenoid 61 is fastened to one end of a connecting rod 67 by a pin 68. The other end of the connecting rod 67 is fastened to the upper end of the lever 26 by a ball joint connection 31. One end of a coil spring 69 is fastened to a pin 70 carried by the head of the armature 64 and the other end of the spring 69 is fastened to an adjustable anchor screw 71 carried by the frame of the solenoid 61. It will be noted that in this modification, the positions of the clutch and brake engaging solenoids are reversed from Figs. 1, 2 and 3 and there can be no movement of the solenoids relative to the casing 11.

The operation and advantages of the device will now be readily understood. When the unit is at rest and neither solenoid is energized, the spring 69 draws the armature 64 to the right as viewed in Fig. 1 causing the armature 63 and the end of the lever 26 to move to the right also. Since the lever 26 pivots on the pin 25 the sleeve 13 is urged to the right carrying the driven shaft 15 with it until the facing 19 of the clutch-brake disc 17 engages the brake member 21 to hold the driven shaft 15 stationary under the brake-engaging force of the spring 69. When the solenoid 61 is energized, the armature 63 is electromagnetically pulled to the left, as viewed in Fig. 4, against the force of the spring 69 until the clutch-brake disc 17 engages the rotatable member 20 causing the shaft 15 to rotate. If the solenoid 61 is de-energized and the solenoid 62 is energized, the armature 64 assists the spring in forcing the disc 17 into engagement with the brake 21. Energization of the solenoids 61 and 62 can be controlled from any convenient location by means of switches (not shown). It will be appreciated that in order to prevent overheating of the solenoids, the positions of the solenoids 61 and 62 relative to each other and relative to the lever 26 must be carefully adjusted so that the solenoid armatures 64 and 63, respectively, will seat firmly in the solenoid frames at the same time the brake and clutch are engaged. This is carefully done when the unit is first assembled. As the friction faces of the clutch-brake disc 17 wear, and it becomes necessary to adjust the clearance distance between the brake 21 and the rotatable member as fully described in the said Turner application, the position of the lever 26 must also be adjusted in order to keep the solenoids 63 and 64 in correct operating relation to the brake 21 and member 20. This is accomplished by turning the thumb screws 28 and 29 to move the fulcrum pin 25 of the lever 26 about the axis of the pin 23. In this manner, the fulcrum of the lever 26 can be moved to compensate for adjustment of the brake 21 and no adjustment of the solenoids 63 and 64 is necessary.

Figure 7:
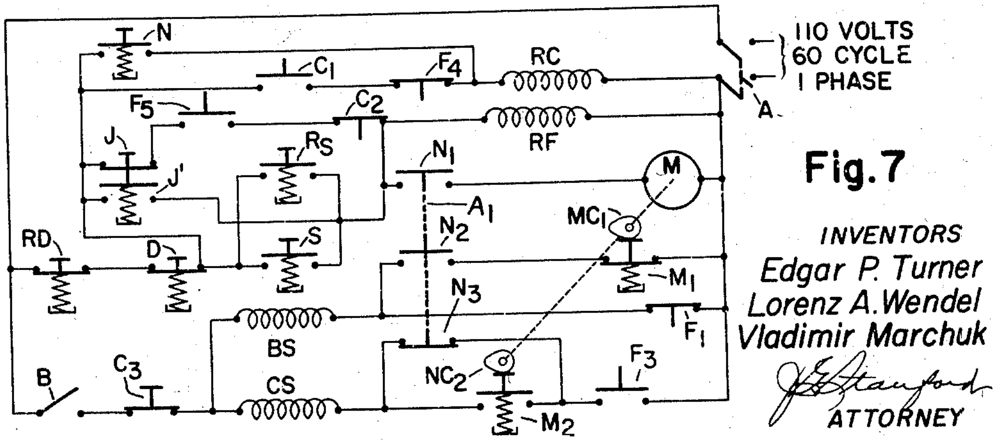
Fig. 7 is a circuit diagram of a control system for the clutch and brake actuating solenoids.

An electrical control circuit for the clutch and brake-engaging solenoids is shown in Fig. 7. In the circuit diagram, the brake engaging solenoid is represented by the coil BS and the clutch-engaging solenoid by the coil CS. The control relay coil RC actuates switches $C_1$, $C_2$ and $C_3$ while the control relay coil RF actuates switches $F_1$, $F_3$, $F_4$ and $F_5$. When the main switch A and switch B are closed, a circuit is completed through the normally closed switches $C_3$, coil BS and closed switch $F_1$, to actuate the brake-engaging solenoid for engaging the disc 17 with the brake 21. To engage the clutch, the disc 17 must be moved into engagement with the rotatable clutch member 20 by the clutch engaging solenoid. This is accomplished by pressing the starting switch S which completes a circuit through normally closed switches RD, D and relay coil RF. Relay coil RF closes switch $F_5$ completing a holding circuit through switches J and $C_2$. Coil RF also opens switch $F_1$, breaking the circuit to the brake solenoid coil BS and releasing the brake, and closes switch $F_3$, completing a circuit through the clutch-engaging solenoid coil CS and engaging the clutch. The clutch is disengaged and the brake re-engaged by pressing the stop switch D which opens the holding circuit to coil RF. When coil RF is de-energized, switch $F_3$ opens breaking the circuit to the clutch solenoid coil CS and switch $F_1$ closes to re-engage the brake.

Under certain conditions, it is desirable to de-energize the brake and clutch solenoid simultaneously without opening the switch D. This is accomplished by closing the neutral positioning switch N which completes a circuit through coil RC closing switch $C_1$ and thus completing a holding circuit for coil RC. At the same time switch $C_2$ is opened to disable the holding circuit for coil RF thus disabling the clutch solenoid coil CS and switch $C_3$ is also opened to disable both the brake and clutch solenoid coils BS and CS, respectively. Closing the start switch S energizes the coil RF to open switch $F_4$ thus disabling the neutral positioning circuit and energizing the clutch solenoid CS as previously described. The jogging switches JJ′ permit the clutch and brake solenoid coils to be energized alternately by depressing and releasing the switches JJ′. With the switches JJ′ in the position shown in Fig. 7, the brake solenoid coil BS is energized. When the switch J is opened and switch J′ simultaneously closed, a circuit is completed through the coil RF which causes the coil CS to be energized and the coil BS to be de-energized as previously described. Thus, opening and closing of the switches JJ′ results in alternate engagement of the clutch and brake. The operation of the unit can be stopped at any time by opening the stop switch D, thus opening the circuit to the coil RF to prevent energization of the clutch coil CS. The switches RS and RD are remote start and stop switches, respectively, which function in the same manner as switches S and RD. Switches RS and D may be located in any convenient location and may be positioned to be actuated automatically by a work table or work-piece (not shown).

At certain times, it is desirable to operate the transmitter automatically, having the clutch and brake solenoid coils energized alternately in timed relation. This is accomplished by moving the switch $A_1$ to close switches $N_1$ and $N_2$ and open switch $N_3$. When switch $A_1$ is closed and the switches RD, D and S are closed, the motor M is energized to rotate cams $MC_1$ and $NC_2$. At the same time coil RF is energized and switches $F_5$ and $F_3$ are closed while switches $F_1$ and $F_4$ open. With switches $M_1$ and $M_2$ in the positions shown in Fig. 3, the brake solenoid coil BS is energized through switches $N_2$ and $M_1$ causing the brake to engage. As the cams $MC_1$ and $NC_2$ rotate, switch $M_1$ is opened and switch $M_2$ is closed. This causes the clutch solenoid CS to be energized through switches $M_2$ and $F_3$ while switch $M_1$ opens to break the circuit through the brake coil BS. As the motor M rotates, cyclic operation of the transmitter clutch and brake is obtained as the switches $M_1$ and $M_2$ are actuated.

It is believed that the many advantages of the invention will be readily appreciated. The solenoid actuated transmitter provides a unit which can be controlled manually or automatically to provide positive clutch and brake engagement. Further, the ease of adjustment in the clutch and brake actuating mechanism provides a dependable unit requiring very little service.

Having thus set forth the nature of the invention, what we claim herein is:

1. A unitary electric power transmitter having a casing, and a driven element, a clutch and brake actuating element for engaging and disengaging the transmitter clutch and brake, a control lever for moving said actuating element, means operatively connecting said lever to said actuating element, means carried by said casing for pivotally supporting said lever, a primary solenoid having an armature operatively connected to said lever for moving said lever in one direction, a second solenoid having a second armature operatively connected to said lever for moving said lever in the opposite direction, yieldable means operatively connecting said armatures together and yieldable in tension and compression, and means for selectively energizing said solenoids.

2. A unitary electric power transmitter having a casing and a rotatable driven element, a clutch and brake actuating member for engaging and disengaging the clutch and brake of said transmitter, a control lever for moving said actuating member, means operatively connecting said lever to said member, an adjustable pivot support for said lever, pivotal means connecting said lever to said pivot support, said pivotal means including a pivot pin, means for moving said pivot pin relative to said actuating member and said casing, a primary solenoid having an armature operatively connected to said lever for moving said lever in one direction, a second solenoid having a second armature operatively connected to said lever for moving said lever in the opposite direction, and means for selectively energizing said solenoids.

3. An electric power transmitter comprising a frame, a rotatable driven shaft carried by said frame, a rotatable driving member, a continuously rotatable driving element, clutch means for operatively connecting said driven shaft to said driving member, brake means for stopping said driven shaft, actuating means for said clutch and brake means, a brake engaging solenoid having an armature, a clutch engaging solenoid having an armature, means operatively connecting said armatures to said actuating means for engaging said clutch and said brake, mounting means for said solenoids, a support plate for said mounting means, and means yieldingly urging said mounting means into frictional contact with said support plate.

4. An electric power transmitter as claimed in claim 3 having means for obtaining heavy engagement of one of said clutch and said brake means.

5. An electric power transmitter as claimed in claim 3 having means for obtaining heavy engagement of one of said clutch and said brake means and light engagement of the other of said clutch and said brake means.

6. An electric power transmitter comprising a frame, a rotatable driven shaft carried by said frame, a rotatable driving member, a continuously rotatable driving element, clutch means for operatively connecting said driven shaft to said driving member, brake means for stopping said driven shaft, actuating means for said clutch and brake means, a brake engaging solenoid having an armature, a clutch actuating solenoid having an armature, means operatively connecting said armatures to said actuating means, support means for said solenoids, friction means between said solenoids and said support means, means yieldingly urging said solenoids towards said support means for applying a normal force to said friction material, and means limiting the movement of said solenoids relative to said support means.

7. A unitary electric power transmitter having a frame, a rotatable driven shaft carried by said frame, a rotatable driving member, a continuously rotatable driving element, clutch means for operatively connecting said driven shaft to said driving member, brake means for stopping said driven shaft, actuating means for said clutch and brake means, a brake engaging solenoid having an armature, a clutch engaging solenoid having an armature, means operatively connecting said armatures to said actuating means for engaging said clutch and said brake, mounting means for said solenoids, means for selectively energizing said solenoids to cause said armatures to seat, and yielding means fastening said solenoid to said mounting means to permit each of said solenoids to move when its armature seats.

References Cited in the file of this patent

UNITED STATES PATENTS

| | | |
|---|---|---|
| 1,621,384 | Thropp | Mar. 15, 1927 |
| 1,834,270 | Ebling | Dec. 1, 1931 |
| 2,201,118 | Beede | May 14, 1940 |
| 2,692,667 | Bliedung et al. | Oct. 26, 1954 |